United States Patent
Cliffton et al.

(12) 
(10) Patent No.: US 6,300,462 B1
(45) Date of Patent: Oct. 9, 2001

(54) PROCESS FOR PREPARING POLY(ETHYLENE-2,6-NAPHTHALENE DICARBOXYLATE

(75) Inventors: Michael Duane Cliffton; Joseph Franklin Knight; Reed Lervik Christiansen, all of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/521,758

(22) Filed: Mar. 9, 2000

Related U.S. Application Data

(60) Provisional application No. 60/183,624, filed on Feb. 18, 2000.

(51) Int. Cl.⁷ ................................................... C08G 64/00
(52) U.S. Cl. ................................................................ 528/272
(58) Field of Search ............................................. 528/272

(56) References Cited

U.S. PATENT DOCUMENTS

| | | |
|---|---|---|
| 3,756,987 | 9/1973 | Winnick . |
| 3,936,421 | 2/1976 | Hayashi et al. . |
| 4,058,507 | 11/1977 | Omoto et al. . |
| 4,097,468 | 6/1978 | James et al. . |
| 4,990,594 | 2/1991 | Cooke et al. . |
| 5,019,640 | 5/1991 | Engel-Badar et al. . |
| 5,082,731 | 1/1992 | Cooke et al. . |
| 5,101,008 | 3/1992 | Cooke et al. . |
| 5,116,938 | 5/1992 | Engel-Bader . |
| 5,138,025 | 8/1992 | Mossman . |
| 5,811,513 | 9/1998 | Iwasaki et al. . |
| 5,895,807 | 4/1999 | Galko et al. . |

FOREIGN PATENT DOCUMENTS 4-80931   12/1992 (JP) .

*Primary Examiner*—Terressa M. Boykin
(74) *Attorney, Agent, or Firm*—Cheryl J. Tubach; B. J. Boshears; Bernard J. Graves, Jr.

(57) ABSTRACT

There is disclosed a process for producing poly(ethylene-2,6-naphthalenedicarboxylate) and copolymers thereof having high molecular weight, low methyl end-group content, low diethylene glycol content and low carboxyl end-group content in the presence of water.

20 Claims, No Drawings

PROCESS FOR PREPARING POLY (ETHYLENE-2,6-NAPHTHALENE DICARBOXYLATE

CROSS REFERENCE TO RELATED APPLICATIONS

This application claims priority upon provisional application Ser. No. 60/183,624 filed Feb. 18, 2000, and the Ser. No. 60/183,624 application is herein incorporated by this reference in its entirety.

FIELD OF THE INVENTION

This invention relates to the production of poly(ethylene-2,6 -naphthalene dicarboxylate) (PEN) or copolymers thereof, via the ester exchange of a component comprising at least 80 to 100 mole percent naphthalene-2,6-dicarboxylate ester, the remainder comprising naphthalene-2,6-dicarboxylic acid, terephthalic acid, isophthalic acid, dimethylterephthalate, dimethylisophthalate, or combinations thereof, with an aliphatic or cycloaliphatic diol component, and mixtures thereof, subsequent polymerization of the ester exchange product to precursor molecular weight polymer, and optionally, solid state polymerization to high molecular weight polymer. More specifically, this invention relates to a process whereby high molecular weight PEN or copolymers thereof is produced with the resulting polymer possessing low methyl end-group content, low diethylene glycol content, and low carboxyl end-group content, although in the presence of water. Such polyesters are suitable for certain fiber applications.

BACKGROUND OF THE INVENTION

A primary method for manufacture of polyesters which is well known in the art, involves a two step process; a melt polymerization step which produces an intermediate molecular weight polymer, followed by solid state polymerization leading to high molecular weight polyester. Generally, two methods are employed in commercial polyester production for the melt phase step. For example, poly(ethylene-2,6-naphthalene dicarboxylate) (PEN) can be made by the reaction of 2,6-naphthalenedicarboxylic acid with excess ethylene glycol (EG). With this method, a prepolymer is first prepared which is advanced with heat and vacuum treatment to a sufficient molecular weight for solid state polymerization. A second method involves an ester exchange reaction between dimethyl-2,6-naphthalene dicarboxylate (DMN) and excess EG to give bis-hydroxyethylenenaphthalate (BHEN) and low molecular weight oligomers, which are polymerized with heat and vacuum treatment to high polymer. For both methods, catalysts are employed in the polymerization step. Commonly used polymerization catalysts are antimony, titanium, tin and germanium for both methods. Common catalytic species employed for ester exchange include zinc, manganese, calcium, and lithium.

The ester exchange catalysts listed are limited in utility when water is present in EG or the starting EG/DMN slurry. A marked reduction in catalyst activity takes place when a small quantity of water is present in the reaction mixture at the start of ester exchange. Catalyst deactivation in this crucial step results in poor conversion of DMN to BHEN. Generally, it has been found that conversions of 96 percent or greater are required for good polymerization rates. High methyl end content, which is a measure of unreacted DMN ester groups remaining in the ester exchange product, lowers melt phase and solid state polymerization rates. In PEN applications where high molecular weight is required, such as tire cord fiber, high methyl ends in the precursor polymer often times prohibits reaching the desired molecular weight during solid state polymerization.

Water in the ester exchange step of melt phase polyester synthesis is well known in the art to deactivate to a greater or lesser extent catalyst activity, depending on the amount of water present in the reaction. U.S. Pat. No. 5,138,025 granted to the Amoco Corporation teaches a method whereby DMN in melt form may be treated to minimize the effect of moisture and oxygen on product quality. Poor ester exchange rate may also arise from water in EG. In a typical manufacturing process for PEN, EG collected from the previous batches (for batch operations) or in the case of a continuous manufacturing process, EG from prior line operation, is refined by distillation to remove impurities, including water, and used again in the process. For economic reasons, such refining may occur in a centralized facility, wherein EG from PEN production may be combined with EG from production of other polyesters. Often times, refined EG will have a water content greater than or equal to one weight percent. This compares to the commercial grade EG, defined here as commercially available polymer grade EG, which typically has water content of less than 0.3 weight percent. The use of commercial grade EG alone in PEN manufacturing processes, with no refined EG use, although attractive from the stand point of good ester exchange rate, is not commercially viable as a result of the expense associated with not recycling this monomer. Although spent commercial grade EG which has gone through the PEN process is distilled to produce refined EG, further distillation to remove water is both costly from the stand point of additional equipment required for further purification of EG, and time consuming.

As mentioned above, the use of commercial grade EG solely in the PEN manufacturing process is not viable due to cost. However, even if commercial grade EG were to be used to make EG/DMN slurry, there is still the potential for water take up from the surroundings. Water can come into contact with the slurry from moisture content in DMN, humidity of the surroundings, including mix tanks and monomer conveying systems, moisture in inert gas used to blanket the reaction, among other sources.

Typical prior art patents include the following.

U.S. Pat. No. 3,756,987 to Winnick discloses a process for preparing polyethylene terephthalate from a diester consisting essentially of a bis-(beta-acyloxyethyl) terephthalate in the presence of sufficient water to react with at least 25% to about 100% of the acyl moieties to liberate the corresponding lower carboxylic acid. The resulting bis-(beta-hydroxyethyl) terephthalate is then polymerized to form polyethylene terephthalate.

U.S. Pat. No. 3,936,421 to Hayashi et al. describes a process for preparing polybutylene terephthalate from terephthalic acid and 1,4-butanediol, where water is present during esterification and can be present in the 1,4-butanediol feed.

U.S. Pat. No. 4,058,507 to Omoto et al. discloses a process for preparing polyethylene terephthalate from dimethyl terephthalate and ethylene glycol, using calcium acetate and cobalt acetate as catalysts, where 0.03 to 0.2 wt. % water is present in the ester exchange reaction system.

U.S. Pat. No. 4,097,468 to James et al. describes a process for continuous esterification, where the feed material is a mixture of terephthalic acid, ethylene glycol, water, and partially esterified terephthalic acid.

U.S. Pat. No. 4,990,594 to Cooke et al. and U.S. Pat. No. 5,082,731 to Cooke et al. describe a process for producing a copolyester from the ester exchange of a lower dialkyl ester of a dicarboxylic acid and glycol and the direct esterification of a dicarboxylic acid and glycol using a catalyst system containing Mn, Li, Sb, and optionally Co, along with an agent to sequester the Mn.

U.S. Pat. No. 5,019,640 to Engel-Bader et al. discloses a process for producing polyethylene terephthalate from a lower dialkyl ester of a dicarboxylic acid and glycol, where Mn and Li are used in the ester exchange section.

U.S. Pat. No. 5,101,008 to Cooke et al. describes a process for making a copolyester from at least two lower dialkyl esters of dicarboxylic acids, wherein Mn, Li, and Sb, and optionally Co or a catalyst sequestering agent are present.

U.S. Pat. No. 5,116,938 to Engel-Bader et al. discloses a process for producing a polyester from a lower dialkyl ester of a dicarboxylic acid and glycol, wherein Mn and Li are used in the ester exchange section, and Co and Sb are used as catalysts during the polycondensation section.

U.S. Pat. No. 5,811,513 to Iwasaki et al. discloses a process for producing polyethylene naphthalate from naphthalenedicarboxylic acid and ethylene glycol in the presence of water, wherein the amount of water is more than 0.03 to 1.5 times that of the ethylene glycol, on a weight basis.

U.S. Pat. No. 5,895,807 to Galko et al. describes a process for making a random polyalkylene terephthalate/naphthalate copolymer, wherein the naphthalate-bearing feedstock is a diester and the terephthalate-bearing feedstock is a diacid.

Japanese Pat. No. 04080931 B to Kamata et al. describes a process wherein at least one water-soluble metal compound selected from Li, Ca, Mn, Co, and Zn is added to a solvent consisting of 10–95 wt. % ethylene glycol and 5–90 wt. % water. This catalyst solution is used in subsequent polymerization of terephthalic acid (or a derivative) with ethylene glycol.

Accordingly, there is a need for a process whereby refined diol component can be used in producing PEN and copolymers of PEN while maintaining good ester exchange activity, and which PEN and copolyesters of PEN are characterized by having low methyl end-group content, low diethylene glycol content, and low carboxyl end-group content.

SUMMARY OF THE INVENTION

These and other objectives are accomplished herein by a polymerization process for producing PEN and copolymers of PEN utilizing a diol component, and in the presence of water, and utilizing a catalyst system comprising at least one or more of each of compounds containing manganese (Mn), lithium (Li) and antimony (Sb), and with at least one or more stabilizing compounds containing phosphorus (P). The process is characterized by good ester exchange activity, and the resultant PEN and copolyesters are characterized by having low methyl end-group content, low diethylene glycol content and low carboxyl end-group content. The resultant polyesters are suitable for certain fiber applications.

The present process produces PEN precursor polymer and copolymers by a melt phase process, comprising ester exchange of a component comprising at least 80 to 100 mole percent of the component, naphthalene-2,6-dicarboxylate ester, the remainder comprising naphthalene-2,6-dicarboxylic acid, terephthalic acid, isophthalic acid, dimethylterephthalate, dimethylisophthalate, or combinations thereof, with a diol component comprising an aliphatic or cycloaliphatic diol and combinations thereof. Without isolation of the ester exchange product, said ester exchange product undergoes melt polymerization to a precursor molecular weight polymer having low methyl end content.

The present process is characterized by good ester exchange catalyst activity leading to conversions of preferably greater than 96 percent.

The present process obtains good ester exchange catalyst activity, as defined above, using a slurry made of the component and diol component. The water content of the slurry is from 0.5 to 2 percent, based on the total weight of the component and the diol component.

DETAILED DESCRIPTION OF THE INVENTION

PEN polymer in this invention is made from DMN and EG. Co-polymers of PEN, as defined by this invention, are made from a component comprising at least 80 mole percent of the component as DMN, the remainder comprising naphthalene-2,6-dicarboxylic acid, terephthalic acid, isophthalic acid, dimethylterephthalate, dimethylisophthalate, or combinations thereof, and a diol component comprising an aliphatic or cycloaliphatic diol and combinations thereof. Aliphatic diols preferably have 2 to 20 carbon atoms, and cycloaliphatic diols preferably have 6 to 20 carbon atoms. Also, included in the definition of aliphatic diols are diols having ether linkages such as polydiols having 4 to 800 carbon atoms. Suitable diols include ethylene glycol, diethylene glycol, triethylene glycol, 1,2-propanediol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol,1,4-butanediol, 1,5-pentanediol, 1,6-hexanediol, 2,2,4-trimethyl-1,6-hexanediol, thioethanol, 1,2-cyclohexanedimethanol, 1,3-cyclohexanedimethanol, and 1,4-cyclohexanedimethanol. Preferably, the diols are ethylene glycol, 1,4-cyclohexanedimethanol, combinations of ethylene glycol with diethylene glycol, combinations of diethylene glycol with 1,4-cyclohexanedimethanol, combinations of ethylene glycol with 1,4-cyclohexanedimethanol, and combinations of ethylene glycol with a variety of suitable co-diols.

Preferably, the component and diol component are added as a slurry at the beginning of the reaction sequence. The ratio of the diol component to the component of the slurry may range from 1.5 to 1 to 6 to 1 on a molar basis. Preferably, this ratio will be in the range of 2 to 1 to 4 to 1. Small quantities of the diol component may be added throughout the process to replace diol lost with heating and vacuum treatment, as a slurry or solution containing catalyst or phosphorus sequestering agent. When naphthalene-2,6-dicarboxylic acid, terephthalic acid, isophthalic acid, or combinations thereof are included in PEN co-polymer, the preferable addition point of these monomers is after the ester exchange step. Dimethyl-2,6-naphthalenedicarboxylate, dimethylterephthalate, dimethylisophthalate, or combinations thereof may also be added to the diol component as a melt in liquid form. Water content in the slurry will vary depending on the grade and source of both the component and diol component. Generally, this invention will afford good ester exchange catalyst activity if the total water content is 0.5 to 2 weight percent based on the total weight of the component and the diol component. Preferably, the water ranges from 0.5 to about 1.0 percent.

Suitable ester exchange catalysts for the synthesis of PEN and co-polymers of PEN by the present invention include any manganese (Mn) containing compound, such as manganese dioxide, manganese oxalate, various manganese glycolates, manganese acetate, in combination with a co-catalyst consisting of a salt of lithium such as lithium acetate, lithium hydroxide, or lithium oxalate. Other examples of suitable manganese salts are manganous benzoate tetrahydrate, manganese chloride, manganese oxide, manganese acetate, manganese acetylacetonate, manganese succinate, manganese diethyldithiocarbamate, manganese antimonate, manganic phosphate monohydrate, manganese glycoloxide, manganese naphthenate and manganese salicyl salicylate. Generally, manganese ester exchange catalyst concentration in the polymer ranges from 20 to 2000 ppm metal ion based on polymer weight. Preferably, manganese ester exchange catalyst concentration ranges from 50 to 500 ppm. Most preferably, manganese ester exchange catalyst concentration ranges from 70 to 120 ppm. Generally, lithium ester exchange co-catalyst concentrations in the polymer range from 5 to 1000 ppm metal ion based on polymer weight. Preferably, lithium ester exchange co-catalyst concentration ranges from 5 to 200 ppm. Most preferably, lithium ester exchange co-catalyst concentration ranges from 5 to 75 ppm. The ester exchange catalyst and lithium co-catalyst may be contacted with the componentidiol/water and, optionally, with the oligomeric ester exchange product of the component and diol, in a temperature range of 25° to 250° C., preferably, in a range of 160° to 200° C.

It is well known in the art that phosphorus sequesters the manganese containing ester exchange catalyst to prevent side reactions during the polymerization step that cause poor polymer color and undesirable by-products. In the preferred embodiment of this invention, phosphorus is added following ester exchange. Ester exchange is concluded preferably after a 96 percent or higher conversion has been obtained. More preferably conversion will be above 97 percent. Sources of phosphorus are phosphoric acid, phosphorous acid, phosphites, phosphate esters, and mixtures thereof. In the preferred embodiment of this invention, the ratio of phosphorus to total manganese containing ester exchange catalyst content ranges from a mole ratio of 0.8 to 3.0 with respect to metal catalyst atoms.

Polymerization catalysts are antimony oxide, antimony triacetate, antimony III and V halides, hydroxides and sulfides; antimony III, IV, and V oxides, antimony salts of carboxylic acids as acetate, lactate, oxalate, phthalate, benzoate, or mixtures thereof; antimony III and V glycolates and mixtures thereof. The polymerization catalyst can be added anytime up to the initiation of vacuum to build polymer molecular weight. However, in the preferred embodiment of this invention, polymerization catalyst is either added with the manganese containing ester exchange catalyst at the beginning of the process, or after addition of the phosphorus source. Generally, when the polymerization catalyst is added after phosphorus addition, it is in the form of a solution or slurry with the diol component. Polymerization catalyst concentration in the polymer ranges from 100 to 500 ppm based on polymer weight, preferably from 150 to 250 ppm. Melt polymerization temperatures can range from 270° to 310° C., preferably in the range of 280° to 290° C. Vacuum can be lowered to one torr or lower during heating to the final polymerization temperature. The melt phase portion of the polymerization is concluded by extruding the polymer into strands and pelletizing upon cooling and solidification.

The PEN polymer may be solid state polymerized to further increase molecular weight. Solid state polymerization is conducted at a temperature range of 220° to 260° C., but below the crystalline melting point of the polymer. An inert gas stream or vacuum may be used to remove diol and oligomeric material during the solid state process. Generally, several hours are required in the solid state process to build molecular weight to the desired target.

Additives such as fillers, for example, titanium dioxide and talc, stabilizers, antioxidants, buffers, colorants, dyes, pigments, and the like, normally used with polyesters may be included as desired. Such additives, their amounts, and their use are well known in the art.

The polyester products of this invention are readily melt processed into useful shapes and forms. For example, they may be melt pressed or extruded into films, extruded into rods or other shapes, spun into fibers, injection molded or compression molded into various shapes, and injection molded preforms may be reheated and blown into bottles, jars and the like.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples, the test procedures listed below were used:

Inherent Viscosity—Inherent viscosity of a polymer is measured at 25° C., at a concentration of 0.5 g/100 ml in a 60/40 solution of pentafluorophenol and 1,2,4-trichlorobenzene.

DEG (weight %)—Polymer sample is hydrolyzed in a mixture of 80:20 n-propanol:dimethyl sulfoxide and potassium hydroxide for 30 minutes at 110°–115° C. The sample is cooled, acidified with 2 N hydrochloric acid in n-propanol, silylated, and analyzed by capillary gas chromatography with phenyl ether as an internal standard.

Me-ends (%)—Polymer sample is hydrolyzed in a solution of potassium hydroxide in 50:50 n-propanol:pyridine. Hydrolysis converts the methyl ends to free methanol. After hydrolysis, an acetonitrile internal standard is added, and the solution is acidified with 4 N hydrochloric acid in water. The resulting mixture is centrifuged, and the clear upper supernatant is analyzed for % methanol by an internal standard gas chromatographic method. % Me-ends is then calculated as $$\% \text{ Me-ends} = (\% \text{ methanol} * DP * 242.23)/64$$

where $$DP = 10^{[(1.447 \times \log_{10} IV) + 2.109]}$$

and IV is Inherent Viscosity, as determined by the method previously described.

Carboxyl-ends (meq/Kg)—2.0 g polymer sample is dissolved in 35 ml hot o-cresol at 120° C., cooled, and diluted with 45 ml methylene chloride. 3 ml of a mixture of 2.5:2.5:1 ethanol:pyridine:water is added to the solution. An automatic titrator dispenses 0.05 N potassium hydroxide in ethanol and potentimetrically determines the endpoint.

Example 1 (COMPARATIVE)

A continuous process for producing PEN was utilized in Example 1. In so doing, a slurry of DMN and EG was prepared, with water in the slurry averaging 0.5 weight percent. The feed mole ratio of EG to DMN was 3 to 1. The slurry was fed to a series of 4 stirred pot reactors. The first reactor had a volume of 52 cubic feet and was operated at a pressure of 35 psig and a temperature of 210° C.; the second reactor had a volume of 34 cubic feet and was operated at a pressure of 24 psig and at a temperature of 220° C.; the third reactor had a volume of 34 cubic feet and was operated at a pressure of 15 psig and at a temperature of 225° C.; and the fourth reactor had a volume of 34 cubic feet and was operated at a pressure of 5 psig and a temperature of 230° C. With the DMN and EG were fed 84 ppm manganese catalyst and 163 ppm antimony catalyst. The manganese (Mn) was introduced as manganese acetate tetrahydrate and the antimony (Sb) was introduced as antimony trioxide. The conversion of DMN to BHEN was 95% upon leaving the fourth ester-exchange reactor.

The resultant material from the ester exchange reactor was passed to a series of 2 prepolymerization reactors. The first prepolymerization reactor had a volume of 23 cubic feet and was operated at a pressure of 350 torr and a temperature of 242° C.; the second prepolymerization reactor had a volume of 23 cubic feet and was operated at a pressure of 150 torr and at a temperature of 252° C. The phosphorus (P) stabilizer in an amount of 44 ppm was fed, as MERPOL A mixed phosphates, produced and sold by DuPont, into the second prepolymerization reactor.

The resultant material from the prepolymerization reactors was then passed to a series of 2 finisher reactors. The first finisher reactor had a volume of 54 cubic feet and was operated at a pressure of 3 torr and a temperature of 275° C.; the second finisher reactor had a volume of 54 cubic feet and was operated at a pressure of 1 torr and at a temperature of 285° C.

The inherent viscosity of the product polymer was 0.68 dl/g, measured at 25° C. at a concentration of 0.5 g/100 ml in a 60/40 solution of pentafluorophenol and 1,2,4-trichlorobenzene. The product polymer is further characterized by having 35% methyl end-groups; 30 meq/kg of carboxyl end-groups; and 0.98 weight % DEG (diethylene glycol). The resulting polymer was solid state polymerized at 250° C. under vacuum (less than 0.5 mm Hg). The polymer did not have sufficient activity to allow achievement of inherent viscosities greater than 1.3 dl/g.

Example 2

The continuous process for producing PEN utilized in Example 1 was carried out using substantially the same process conditions, feed materials and catalyst feed points. The only differences were use in the second ester exchange reactor of a pressure of 25 psig, rather than a pressure of 24 psig, and a different catalyst system. In this example which is representative of the inventive process, the catalyst system comprised 115 ppm manganese (Mn), 173 ppm antimony (Sb), and 25 ppm lithium (Li), all fed with the DMN and EG. The phosphorus (P) was utilized in an amount of 84 ppm. The manganese was introduced as manganese acetate tetrahydrate; the antimony was introduced as antimony trioxide; the lithium was introduced as lithium hydroxide; and the phosphorus was introduced as MERPOL A mixed phosphates, produced and sold by DuPont.

The effect of the specific catalyst system was significant and unexpected. For instance, as a result of using the specified catalyst system, the conversion of DMN to BHEN was 97% upon leaving the fourth ester-exchange reactor. This is significantly higher conversion than was obtained in the comparative Example 1, using a different catalyst system.

The inherent viscosity of the product determined as in Example 1, was likewise 0.68 dl/g.

The product polymer of the Example 2, prepared using the catalyst system of the present invention, is further characterized by having 17% methyl end-groups; 20 meq/Kg carboxyl end-groups; and 0.78 weight % DEG (diethylene glycol). By comparison with the product polymer of Example 1, the product polymer of Example 2 is characterized by having a lower level of methyl end-groups, a lower level of carboxyl end-groups, and a lower concentration of DEG (diethylene glycol).

The resultant product polymer was solid state polymerized at 250° C. under vacuum (less than 0.5 mm Hg). The polymer had sufficient activity to allow achievement of inherent viscosities greater than 1.3 dl/g. Polymers having such inherent viscosities are particularly useful for tire applications.

It should be clearly understood that the forms of the invention herein described are illustrative only and are not intended to limit the scope of the invention. The present invention includes all modifications falling within the scope of the following claims.

We claim:

1. A process for producing a poly(ethylene-2,6-naphthalene dicarboxylate), and copolymers thereof, comprising mixing a component selected from the group consisting of naphthalene-2,6-dicarboxylate ester, in an amount ranging from at least 80 to 100 mole percent, with the remainder comprising naphthalene-2,6-dicarboxylic acid, terephthalic acid, isophthalic acid, dimethylterephthalate, dimethylisophthalate, or mixtures thereof, with a diol component selected from the group consisting of aliphatic diols, cycloaliphatic diols, and mixtures thereof, the poly(ethylene-2,6-naphthalene dicarboxylate) and copolymers thereof having been prepared in the presence of water in an amount ranging from 0.5 to 2.0 weight percent based on the total weight of the component and the diol component, and in the presence of a catalyst system comprising a manganese containing compound in combination with a lithium co-catalyst, and antimony, and in the presence of at least one or more stabilizing compounds containing phosphorus wherein said poly (ethylene-2,6-naphthalene dicarboxylate), and copolymer thereof has less than about 0.8 weight % diethylene glycol content and less than about 20% methyl end-groups.

2. The process according to claim 1 wherein the component is naphthalene-2,6-dicarboxylate ester.

3. The process according to claim 1 wherein the diol component is selected from the group consisting of ethylene glycol, 1,4-butanediol, 1,4-cyclohexanedimethanol, diethylene glycol and mixtures thereof.

4. The process according to claim 3 wherein the diol component is ethylene glycol.

5. The process of claim 2 wherein the diol component is ethylene glycol.

6. The process according to claim 1 wherein the water is present in an amount ranging from 0.5 to about 1.0 weight percent based on the total weight of the component and the diol component.

7. The process according to claim 1 wherein the manganese containing compound is manganese acetate.

8. The process according to claim 1 wherein the lithium containing compound is lithium hydroxide.

9. The process according to claim 1 wherein the antimony containing compound is selected from the group consisting of antimony acetate and antimony trioxide.

10. The process according to claim 1 wherein the manganese containing compound is present in an amount ranging from 20 to 2000 ppm based on the weight of the poly(ethylene-2,6-naphthalene dicarboxylate) and copolymers thereof.

11. The process according to claim 1 wherein the lithium containing compound is present in an amount ranging from 5 to 200 ppm, based on the weight of the poly(ethylene-2,6-naphthalene dicarboxylate) and copolymers thereof.

12. The process according to claim 1 wherein the antimony containing compound is present in an amount ranging from about 100 to 500 ppm, based on the weight of the poly(ethylene-2,6-naphthalene dicarboxylate) and copolymers thereof.

13. The process according to claim 1 wherein the phosphorus containing compound is at least one or more phosphate esters.

14. The process according to claim 1 wherein the phosphorus containing compound is phosphoric acid.

15. The process according to claim 1 wherein the component, the diol component and the water are premixed.

16. The process according to claim 15 wherein the molar ratio of the diol component to the component ranges from 1.5:1 to 6:1.

17. A process for producing a poly(ethylene-2,6-naphthalene dicarboxylate), and copolymers thereof, comprising mixing under transesterification conditions a component selected from the group consisting of naphthalene-2,6-dicarboxylate ester, in an amount ranging from at least 80 to 100 mole percent, with the remainder comprising naphthalene-2,6-dicarboxylic acid, terephthalic acid, isophthalic acid, dimethylterephthalate, dimethylisophthalate, or mixtures thereof, with a slurry comprising a diol component selected from the group consisting of ethylene glycol, 1,4-butanediol, 1,4-cyclohexanedimethanol, diethylene glycol and mixtures thereof and from 0.5 to 2.0 weight percent water, based on the total weight of the component and the diol component, and in the presence of a catalyst system comprising at least one of a manganese containing compound, a lithium containing compound and an antimony containing compound and in the presence of at least one or more stabilizing compounds containing phosphorus wherein said poly(ethylene-2,6-naphthalene dicarboxylate), and copolymer thereof has less than about 0.8 weight % diethylene glycol content and less than about 20% methyl endgroups.

18. The process of claim 17 wherein said catalyst system contains from 20 to 2000 ppm manganese and 5 to 200 ppm lithium based on the weight of the poly(ethylene-2,6-naphthalene dicarboxylate) and copolymers thereof.

19. A process for producing a poly(ethylene-2,6-naphthalene dicarboxylate), and copolymers thereof, comprising mixing under transesterification conditions a component selected from the group consisting of naphthalene-2,6-dicarboxylate ester, in an amount ranging from at least 80 to 100 mole percent, with the remainder comprising naphthalene-2,6-dicarboxylic acid, terephthalic acid, isophthalic acid, dimethylterephthalate, dimethylisophthalate, or mixtures thereof, with a slurry comprising ethylene glycol and from 0.5 to 2.0 weight percent water, based on the total weight of the component and the diol component, and in the presence of a catalyst system having from 20 to 2000 ppm manganese and 5 to 200 ppm lithium, based on the weight of the poly(ethylene-2,6-naphthalene dicarboxylate) and copolymers thereof, and in the presence of at least one or more stabilizing compounds containing phosphorus wherein said poly(ethylene-2,6-naphthalene dicarboxylate), and copolymer thereof has less than about 0.8 weight % diethylene glycol content and less than about 20% methyl endgroups.

20. The process of claim 19 wherein said component is naphthalene-2,6-dicarboxylate ester.

* * * * *